Oct. 3, 1939.  L. C. JONES  2,174,941
WINDOW GUARD
Filed March 20, 1939   2 Sheets-Sheet 1

Inventor
Lewis C. Jones

By Clarence A. O'Brien
and Hyman Berman
Attorneys

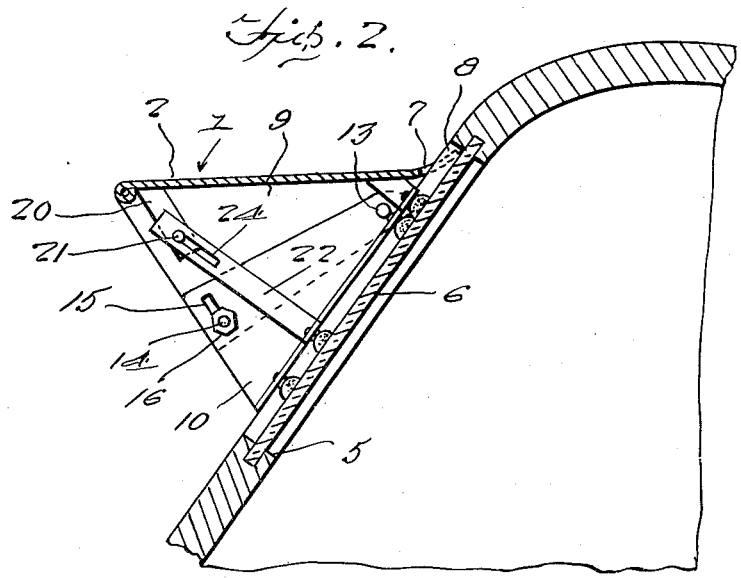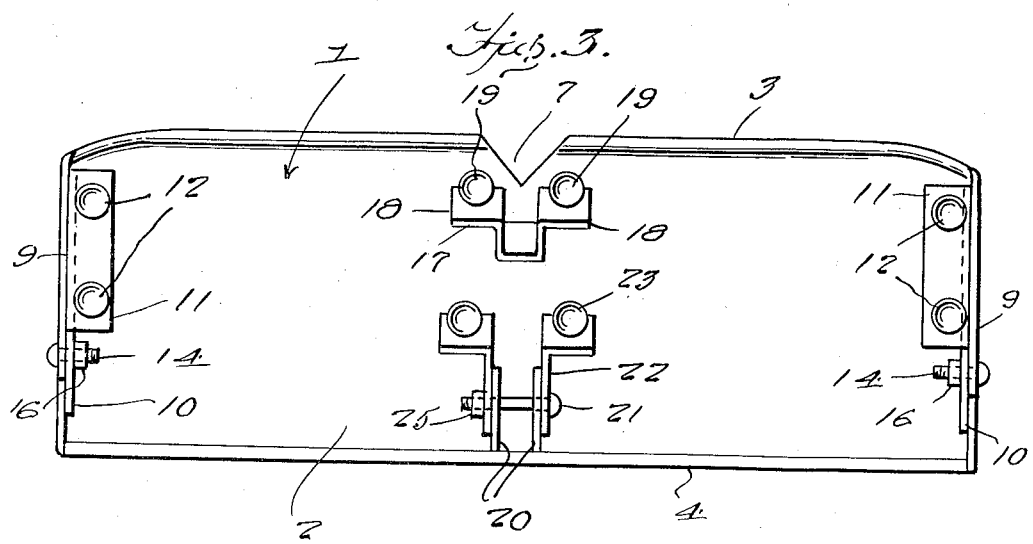

Patented Oct. 3, 1939

2,174,941

UNITED STATES PATENT OFFICE 2,174,941

WINDOW GUARD

Lewis C. Jones, Utica, N. Y.

Application March 20, 1939, Serial No. 263,018

1 Claim. (Cl. 296—44)

My invention relates to improvements in window guards for use on the rear windows of automobiles.

The invention is designed with the particular purpose in view of providing a lightweight, inexpensive device of the character specified which is readily attachable to and detachable from the rear window to prevent snow and ice from collecting thereon and thereby obstructing clear vision through the same.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 2 is a view in vertical section taken on the line 2—2 of Figure 1 looking in the direction indicated by the arrows and drawn to an enlarged scale.

Figure 3 is a view in elevation of the visor member looking at the under side thereof.

Figure 1:
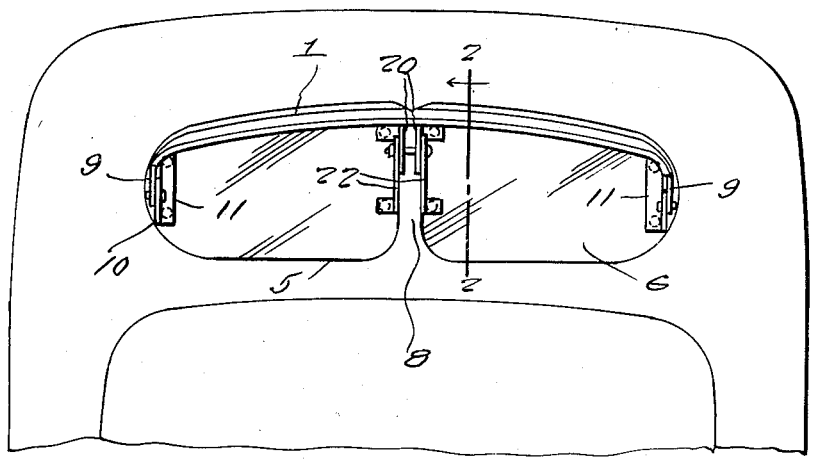
Figure 1 is a fragmentary view in rear elevation of an automobile body having the guard of my invention applied to the rear window thereof.
Figure 5:
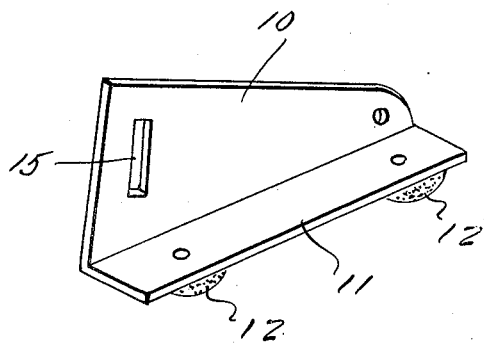
Figure 5 is a view in perspective of one of the extensions.
Figure 4:
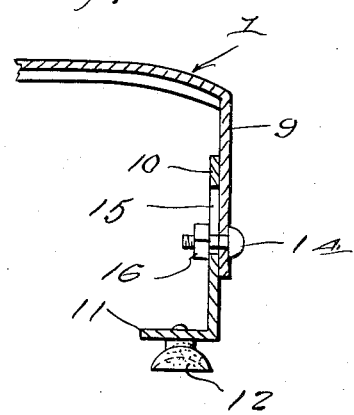
Figure 4 is a fragmentary view in transverse section taken on the line 4—4 of Figure 3.

Referring to the drawings by numerals, the guard of my invention comprises, as its principal element, a plate-like visor 1 of any suitable material, such as sheet metal, having a substantially rectangular body part 2 provided with a curved front side edge 3 and a rear side edge rolled, as at 4, to reinforce the same. The body part 1 is designed to fit at its front edge 3 in the window opening 5 of the automobile body against the window pane 6 and to incline rearwardly and downwardly from said pane and is of a width adapting the same to extend well beyond the bottom of the usual modern slanting automobile window. The front side edge 3 may be bowed to conform with the curvature of a modern type window opening 5 of present-day automobiles and notched, as at 7, to straddle the usual dividing bar 8 of such windows.

The body part 2 of the visor 1 has formed integrally therewith rightangularly disposed triangular end flaps 9 flaring edgewise downwardly and rearwardly. A pair of sheet metal extensions 10 are provided for said flaps 9, said extensions being similar in shape to said flaps. The extensions 10 are designed to be attached to the window pane 6 against the ends thereof to extend edgewise rearwardly therefrom, small ends uppermost. For this purpose each extension 10 is provided with a rightangularly related inturned front edge flange 11 and with a pair of resilient suction cups 12 on said flange adjacent opposite ends of the latter for attachment to the window pane 6. The end flaps 9 are pivoted, as at 13, to the smaller ends of said extensions 10, whereby the visor 1 may be swung up and down on said extensions 10 into different inclined positions. The visor 1 may be clamped to the extensions 10 in different set positions by means of bolts, as at 14, extending through said flaps 9 and through slots in said extensions 10, as at 15, and equipped with nuts 16.

Additional means for detachably securing the visor 1 to the window pane 6 are provided as follows. In the transverse center of the part 2 of said visor adjacent the front side edge 3 thereof, a U-shaped bracket 17 is suitably fixed to said part to straddle the bar 8, said bracket terminating in rightangled ends 18 equipped with a pair of suction cups 19 for attachment to said pane 6. A pair of laterally spaced arms 20 extend from the under, or front, face of said part 2 on opposite sides of the transverse center thereof, respectively, adjacent to said center and the rear edge of said part, said arms having a bolt 21 extending therethrough. A pair of brace bars 22 are connected at the corresponding ends thereof, side by side, to said arms 20, respectively, by the bolt 21, whereby said bars are located upon opposite sides of said bar 8, respectively. The opposite ends of said bars 22 are rightangled and equipped with suction cups 23 for attachment to the window pane 6 adjacent the lower edge thereof and also adjacent opposite sides of the dividing bar 8. Slots, as at 24, in the bars 22, through which the bolt 21 extends, provide for a sliding and pivotal connection of the bars 22 to the arms 20. A nut 25 on the bolt 21 provides for clamping the bars 22 to the arms 20.

As will be manifest, the arms 20 and bars 22, likewise the bracket 17 brace the center of the visor 1 under a load of snow thereon. By loosening the nuts 16 and the nut 25, the visor 1 may be swung on the pivots 13 and cups 19 to different positions and under tightening of said nuts clamp said extensions 10 and bars 22 in such different positions. By breaking the suction of the cups 12, 19 and 23, the entire device may be easily detached.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

A guard for the rear window of an automobile including a visor adapted to be attached to said window in rearwardly and downwardly extending position and including a flat body part of substantially the length of said window having triangular end flaps downturned at right angles thereto, and means to attach said flaps to the window pane for swinging adjustment of said visor vertically into different set positions comprising a pair of triangular extensions for said flaps, respectively, suction cups spaced along one edge of each extension for attaching the latter to said pane in vertical rearwardly extending position thereon with one apex end uppermost, pivotal connections between the apex ends of said extensions and the upper ends of said flaps, and means in the transverse center of said visor for attaching the body part to said pane on opposite sides of a central window strip including a pair of laterally spaced brace bars pivotally and slidably connected to the body part adjacent the lower edge thereof and provided with outturned ends having suction cups thereon, and a U-shaped bracket extending from said part adjacent the upper edge thereof and having outturned ends also provided with suction cups thereon.

LEWIS C. JONES.